UNITED STATES PATENT OFFICE.

RICHARD BRASCH, OF HÖCHST-ON-THE-MAIN, GERMANY, ASSIGNOR TO THE FARBWERKE, VORMALS MEISTER, LUCIUS & BRÜNING, OF SAME PLACE.

GREEN ALIZARIN DYE AND METHOD OF MAKING SAME.

SPECIFICATION forming part of Letters Patent No. 569,405, dated October 13, 1896.

Application filed January 11, 1895. Serial No. 534,575. (Specimens.) Patented in Germany March 5, 1892, No. 67,470; in England August 5, 1892, No. 14,717, and in France August 18, 1892, No. 223,766.

*To all whom it may concern:*

Be it known that I, RICHARD BRASCH, a citizen of the Empire of Germany, and a resident of Höchst-on-the-Main, in the Empire of Germany, have invented certain new and useful Improvements in the Production of Novel Green Alizarin Coloring-Matters of the Quinolin Series, (for which I have obtained Letters Patent in Germany, No. 67,470, dated March 5, 1892; in France, No. 223,766, dated August 18, 1892, and in England, No. 14,717, dated August 5, 1892,) of which the following is a specification.

The alpha-amido and alpha-nitro compounds of alizarin, the production and qualities of which have been described by me, concurrent application for Letters Patent, Serial No. 534,574, filed January 11, 1895, can, as I have discovered, be converted by quinolizing into novel green coloring-matters. In the case of all these nitroresp. amidoalizarins the quinolizing proceeds in exactly the same manner, so that also mixtures of these alizarin derivatives can be worked with.

Example 1: One part of alpha-amido alizarin in fine powder is dissolved in from seven to eight parts of sulfuric acid of 66° Baumé and mixed with one-half part of glycerin and one-half part of nitrobenzene. The mass is slowly heated to 110° centigrade, kept at this temperature for three hours, and afterward poured into water. The dark-colored quinolin compound which separates is filtered off and washed.

Example 2: One part of the alpha-nitroalizarin is dissolved in ten parts of concentrated sulfuric acid at 115° centigrade. Three parts of glycerin are gradually added and the whole heated at 120° centigrade until no more unchanged nitro body remains, which will take about ten hours. In order to purify the quinolin compound, it is dissolved in sodium bisulfite, filtered, and precipitated in unchanged condition by boiling with an excess of diluted sulfuric acid, or the crude quinolin is recrystallized from hot diluted sulfuric acid, and the sulfate of the quinolin thus obtained split up by washing in water. The impurities contained in the crude quinolin can also be removed by boiling with hot diluted caustic soda.

The three alpha-quinolins are very similar in quality. All of them dye chrome-mordanted stuffs green shades. The alizarin (dioxyanthraquinone) alpha-quinolin is of deep-blue violet to black color, and like the two other alpha-quinolins it is nearly insoluble in water and very difficultly soluble in the usual organic solvents, such as ether, alcohol, benzene, ligroin, &c. In strong sulfuric acid it is easily soluble, forming the red sulfate. In alkali sulfites it dissolves just like the two other alpha-quinolins, easily and with pretty carmine-red color. The ammonium salt, which is obtained by admixing the finely-divided quinolin with an excess of ammonia liquid, is of dark-blue color; the neutral sodium salt is light green, the former salt being difficultly soluble, the latter nearly insoluble. The anthrapurpurin alpha-quinolin is blueish black, the ammonium salt dark-green blue, and like the green sodium salt very difficultly soluble even in hot water. The flavopurpurin alpha-quinolin is greenish black when suspended in water. It forms with a small excess of lye a nearly-insoluble salt of grey-violet color, which color is not changed by boiling. A larger excess of lye produces a blue salt. Ammonia produces a dark-brownish red compound. Strong solutions of mineral acids produce, just as with the other quinolins, solutions of red salts decomposable by water.

The free alpha-quinolins of alizarins, the flavo and anthra purpurins, even in form of pastes, are but little adapted for dyeing and printing. Their bisulfite compounds, on the contrary, give good results in dyeing and printing by reason of the easy solubility and decomposability by steam. The green shades obtained vary in conformity to the alizarin used as raw material and to the mordant employed. Up to now the anthrapurpurin alpha-quinolin has furnished the clearest, the flavopurpurin the dullest, green. The alizarin alpha-quinolins produce on chrome mordants a full green of good yield and on nickel-magnesium mordant slight-green shades of greater brilliancy. The fastness to light and soap of the colors is equal to that of the shades produced with alizarin blue.

The quinolin-bisulfite compounds, easily soluble in water, are obtained by prolonged treatment of the finely-divided coloring-matter with concentrated solutions of alkali-bisulfites—for example, sodium bisulfite at from 0 to 50° centigrade. The solution thus obtained is filtered, precipitated by means of common salt, and directly used in form of pastes, or dried at low temperature, powdered, and brought into commerce in powder form.

What I claim as my invention is—

1. The process of producing novel green coloring-matters from alpha-amido and alpha-nitro compounds of alizarin, which consists in mixing these alizarin compounds with glycerin and sulfuric acid, gradually heating the mixture up to a temperature of from 110° to 120° centigrade and separating the quinolized product by pouring the heated mixture into water, substantially as set forth.

2. The process herein described of producing green coloring-matters from alpha-amido and alpha-nitro compounds of alizarin, which consists in quinolizing said compounds by heating them with glycerin and sulfuric acid, separating them by pouring them into water, next heating the quinolin compounds with concentrated solutions of alkaline-bisulfite compounds, such as sodium bisulfite so as to produce easily-soluble bisulfite compounds from the quinolized alizarin compounds, substantially as set forth.

3. As a new product, the alpha-quinolin compound of alizarin, being nearly insoluble in water, difficultly soluble in the ordinary organic solvents, easily soluble in sulfuric acid, soluble in alkali-sulfite compounds with a pretty carmine-red color, and dyeing mordanted wool and cotton in green shades, substantially as set forth.

In testimony that I claim the foregoing as my invention I have signed my name in presence of two subscribing witnesses.

RICHARD BRASCH.

Witnesses:
HEINRICH HAHN,
BERNHARD LEYDECKER.